No. 727,269. PATENTED MAY 5, 1903.
R. H. BERKSTRESSER.
PIE CRIMPER AND TRIMMER.
APPLICATION FILED OCT. 2, 1902.
NO MODEL.
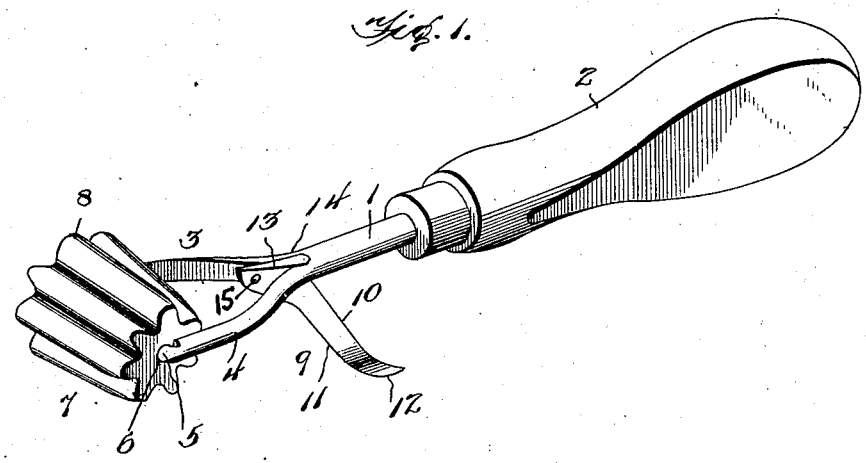
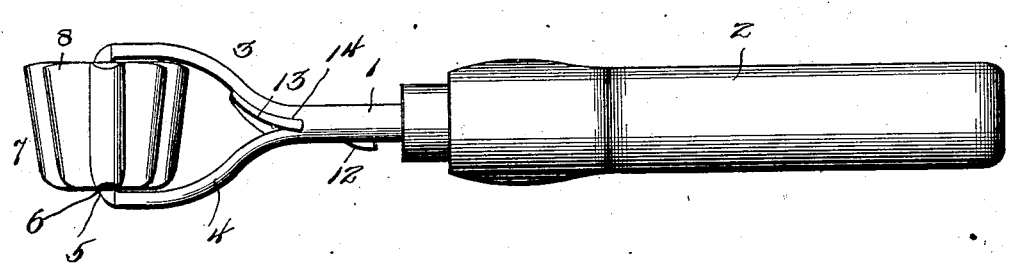
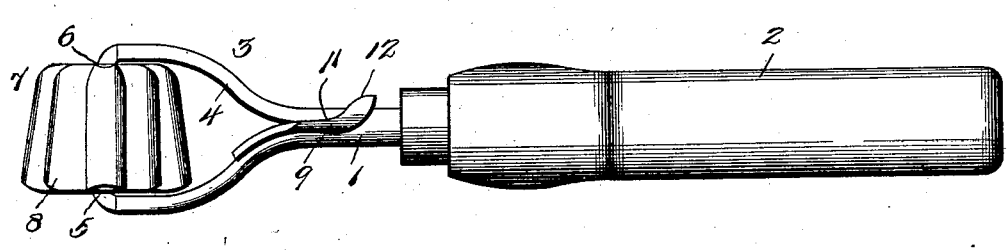
Witnesses
T. L. Hockman
G. S. Roy
Inventor
Robert H. Berkstresser
By L. Deane Son
Attorneys No. 727,269. Patented May 5, 1903.

UNITED STATES PATENT OFFICE.

ROBERT H. BERKSTRESSER, OF YORK, PENNSYLVANIA.

PIE CRIMPER AND TRIMMER.

SPECIFICATION forming part of Letters Patent No. 727,269, dated May 5, 1903.

Application filed October 2, 1902. Serial No. 125,657. (No model.)

*To all whom it may concern:*

Be it known that I, ROBERT H. BERKSTRESSER, a citizen of the United States, residing at York, in the county of York and State of Pennsylvania, have invented certain new and useful Improvements in Pie Crimpers and Trimmers, of which the following is a specification.

This invention relates to kitchen utensils particularly employed in the shaping and making of pastry.

To this end the invention has in view a simple and practical construction of utensil designed as a combined pie crimper and trimmer comprising simple and efficient means for conveniently and uniformly crimping the pie-dough when placed in the pan and simultaneously trimming off the edges very neatly, thus accomplishing in a single operation what is usually performed in a rather imperfect way by the separate use of a fork or equivalent utensil for crimping and the ordinary kitchen-knife for trimming off the edges of the dough. In carrying out this object the invention has in view the construction of the crimping and trimming utensil in a cheap and simple manner while at the same time providing a utensil in which there are no working parts to get out of order and which can be employed with facility and accuracy by the most inexperienced person.

With these and many other objects in view, which will more readily appear as the nature of the invention is better understood, the same consists in the novel construction, combination, and arrangement of parts, which will hereinafter be more fully described, illustrated, and claimed.

The essential feature of the invention, involved in the novel manner of mounting the trimming-knife in relation to the crimping-roll, is susceptible to some modification; but a preferred embodiment of the invention is shown in the accompanying drawings, in which—

Figure 1 is a perspective view of a combined pie crimper and trimmer constructed in accordance with the present invention. Figs. 2 and 3 are respectively top and bottom plan views thereof.

Like numerals of reference designate corresponding parts throughout the several figures of the drawings.

In carrying out the invention the operative parts of the device are supported and carried by a suitable stem, (designated in the drawings by the numeral 1.) This stem 1 may be of any suitable construction, but preferably consists of a rod or bar fitted with a handle or hand-grip 2, which may be conveniently grasped by the hand of the operator for manipulating the device. At its end opposite the handle said carrying-stem 1 is provided with an expanded bearing-fork 3, consisting of the opposite side bearing-arms 4, provided at their outer extremities with the inturned journals 5, which project into the bearing-openings 6 of the revoluble crimping-roll 7. The revoluble crimping-roll 7 is thus loosely and freely journaled on a horizontal axis at one end of the carrying-stem 1 and is held to a working position inside of the bearing-fork 3. This roll may be of solid or hollow formation, but usually consists of a solid block or body of a frusto-conical form and provided with a peripheral series of continuous longitudinal crimping-corrugations 8, running the full length of the body of the roll and serving to provide for the uniform crimping or scalloping of the edge of the dough as the roll is run over the same.

One of the distinctive features of the invention resides in associating with the roll 7 a trimming-knife 9, which acts as a trailer in rear of the roll. Said trimming-knife 9 essentially consists of a knife-blade 10, set at a backward inclination and having its front edge 11 sharpened to provide a well-defined cutting edge, which by reason of the inclination of the blade necessarily exerts a shearing action or cut. At its lower end the knife-blade 10 is formed with a curved and laterally-deflected guide-lip 12, which serves to guide and maintain the device in operative position as it is moved about the edge of the pie-pan. Also it is to be observed that the body of the blade is set at an angle to the axial plane of the carrying-stem 1, so as to incline toward the edge of the pie about which the device is carried.

To provide for rigidly and permanently holding the knife 9 in position, the blade 10 thereof is preferably provided with an expanded or widened head portion 13, seated in a kerf 14, provided at the base of the fork 3 and firmly held in place by the rivets or equivalent fastenings 15.

When the pie is ready for crimping and trimming, the roll 7 is simply revolved around the edge of the pie, and the knife 9, which follows the roll, will necessarily simultaneously cut off the surplus dough and provide a neat and uniformly-trimmed edge.

Changes in the form, proportion, and minor details of construction may be resorted to without departing from the spirit of the invention or sacrificing any of the advantages thereof.

Having thus described the invention, what is claimed, and desired to be secured by Letters Patent, is—

1. In a pie crimper and trimmer, a carrying-stem having a handle at one end and provided at its other end with a bearing-fork, said stem being further provided at the base of the fork with a kerf, a corrugated crimping-roll journaled in said bearing-fork, and a trimming-knife consisting of a blade having at its lower end a lateral guiding deflection and at its upper end an expanded head portion seated in said kerf.

2. In a pie crimper and trimmer, a carrying-stem having a handle at one end and provided at its other end with a bearing-fork, a corrugated crimping-roll journaled in said bearing-fork, and a trimming-knife consisting of a blade having at its lower end a lateral guiding deflection and its upper end fitted in the base of the fork.

In testimony whereof I affix my signature in presence of two witnesses.

ROBERT H. BERKSTRESSER.

Witnesses:
J. EDWARD LEWIS,
HENRY J. GROSS.